United States Patent [19]
Bizot et al.

[11] Patent Number: 4,566,225
[45] Date of Patent: Jan. 28, 1986

[54] PROCESS AND APPARATUS FOR THE PRECISION MEASUREMENT OF ROTOR BLADE-HEIGHT

[75] Inventors: Henri Bizot, Paris; Jean Dautremont, Vaux-le-Penil; Alain Sylvian, Thibault des Vignes, all of France

[73] Assignee: Societe Nationale d'Etude et de Construction de Moteurs d'Aviation "S.N.E.C.M.A.", Paris, France

[21] Appl. No.: 601,726

[22] Filed: Apr. 18, 1984

[30] Foreign Application Priority Data

Apr. 20, 1983 [FR] France ............................. 83 06416

[51] Int. Cl.[4] .............................................. B24B 49/12
[52] U.S. Cl. ............................ 51/165.72; 51/289 R; 51/105 R; 29/156.8 R; 73/432 L; 219/121 LM
[58] Field of Search ............ 51/165.72, 289 R, 105 R; 29/404, 156.8 R; 73/432 L; 219/121 LM

[56] References Cited
U.S. PATENT DOCUMENTS

| | | | |
|---|---|---|---|
| 3,673,897 | 7/1972 | Gassner | 29/110 |
| 4,074,104 | 2/1978 | Fulkerson | 219/121 LM |
| 4,501,095 | 2/1985 | Driukuth | 51/165.72 |
| 4,512,115 | 4/1985 | Miller | 51/49 |

FOREIGN PATENT DOCUMENTS 2700713 7/1978 Fed. Rep. of Germany ... 51/165.72

OTHER PUBLICATIONS

General Electric Extract from GEK 50355 "The CF6 Engine Compressor Rotor EROM Fixture Manual" Mar. 1, 1978, pp. 1 & 2 Section 1-1.
General Electric Extract from Shop Manual CF6-50 Engine, "Assembly" 72-31-00, Jun. 1, 1977, pp. 548-551.
Techmet Company publication "Lazer Mike" received Nov. 14, 1983.

Primary Examiner—Harold D. Whitehead
Attorney, Agent, or Firm—Bacon & Thomas

[57] ABSTRACT

A process and apparatus are disclosed for the precision measurement of the height of turbine rotor blades which enables the measurement of the height of individual turbine blades by utilizing a stroboscopically controlled laser beam. A grinding wheel is also associated with the apparatus to reduce the height of the blade when it exceeds a predetermined value. The measurement and control of the rotor blade is achieved while the turbine wheel is being rotated at speeds sufficient to centrifuge all of the blades to their maximum radially outward position.

10 Claims, 3 Drawing Figures

PROCESS AND APPARATUS FOR THE PRECISION MEASUREMENT OF ROTOR BLADE-HEIGHT

BACKGROUND OF THE INVENTION

The present invention relates to a process and an apparatus for precision measurement of the height of the blades of a turbine rotor rotating at high velocity, and particularly by the use of a laser.

The use of a laser to measure the rotor blades is shown in French pat. No. 2,287,677. The broad concept of utilizing a laser to determine the radial dimension of a rotating object is, of course, well known in the art. Such has been utilized to determine and control a grinder to minimize radial runout of a tire and to measure the clearance between a rotating rotor blade and a housing. Such devices have also been utilized to determine the outer dimension of a turbine wheel.

SUMMARY OF THE INVENTION

The instant invention relates to the precision measurement and control of the height of a turbine rotor blade by utilizing a stroboscopically controlled laser beam such that the measurement of each individual blade may be achieved. The invention also envisions the use of means to reduce the height of a blade, such as a grinding wheel, which exceeds a predetermined value. These features are achieved while the turbine wheel is being rotated at speeds sufficient to centrifuge all of the blades in their maximum radially outward position such that the blade roots are wedged against the retaining wall of the turbine rotor grooves.

The invention incorporates a laser beam having a predetermined height directed tangentially across the rotating turbine rotor in a direction generally perpendicular to its rotational axis such that the tips of the blades extend at least partially into the beam. A photoelectric cell is disposed in the beam path on the opposite side of the turbine wheel such that it may receive that portion of the beam which is not obscured by the presence of the turbine blade tip. The photoelectric cell generates an electrical signal based upon the luminous intensity of the beam, which signal is transmitted to an analyzer-recorder which records and/or displays the height of the blade. The blade height may be defined as the distance from the tip of the blade to the axis about which the turbine wheel rotates.

The invention also utilizes a stroboscopic control means connected to the laser apparatus such that each blade may be measured individually. The strobe frequency may be manually or automatically altered according to the rotational speed of the turbine rotor.

DETAILED DESCRIPTION OF THE PREFERRED EMBODIMENTS

Figure 1:
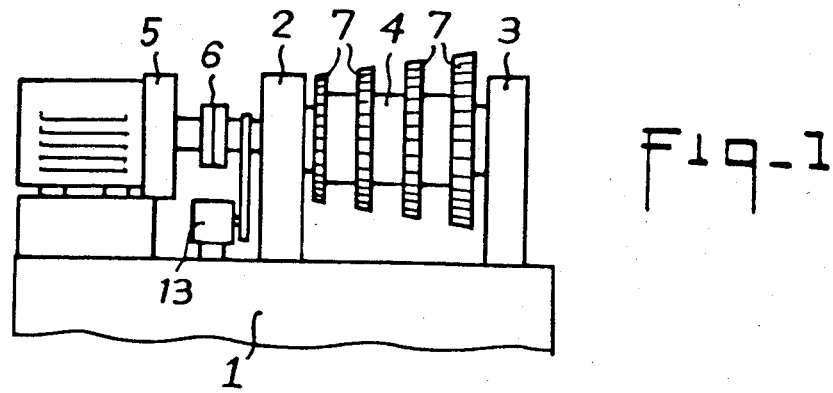
FIG. 1 is a partial front view of the apparatus according to the invention.
Figure 2:
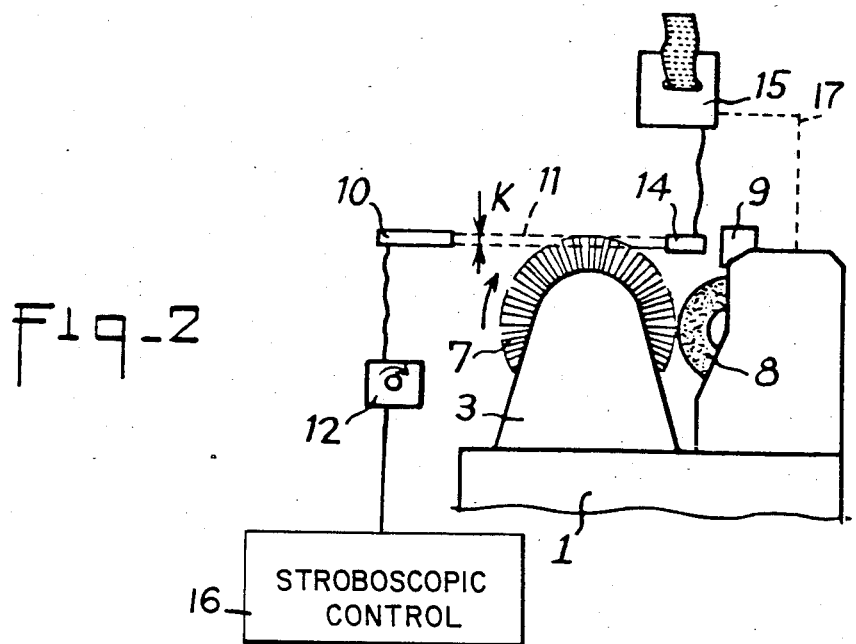
FIG. 2 is a schematic side view of the apparatus shown in FIG. 1.

FIGS. 1 and 2 show schematic front and side views of the apparatus utilized to carry out the process according to the invention. A base or stand 1 has rotational bearing structures 2 and 3 attached to its upper surface such that turbine rotor 4 may be rotatingly attached between the bearings. Turbine rotor 4 is driven at high velocity, which may be on the order of approximately 3000 rpm, by electric motor 5 through coupling 6. Motor 5 may be a 45 kW dc motor or the like.

Base or stand 1 also has a device for rectifying or reducing the height of turbine blades 7 located on the turbine rotor 4. This device may consist of grinding wheels 8 located adjacent each of the rows of the turbine blades and provided with means to rotate the grinding wheels at a velocity of approximately 1250 rpm. Dressing devices 9 may also be associated with each of the grinding wheels 8 to maintain the concentricity of the grinding wheels. The grinding wheels and their driving means may be of any known type and their nature forms no part of the instant invention.

Figure 3:
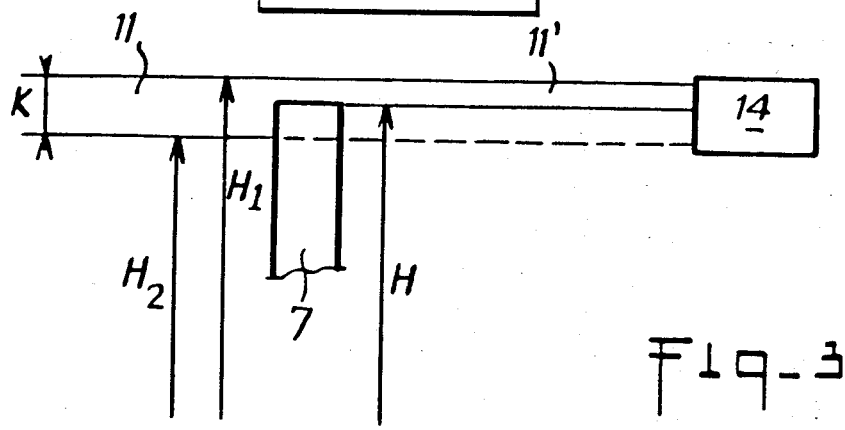
FIG. 3 is a partial, enlarged view showing the rotor blade tips, the laser beam and the photocell of FIG. 2.

A laser device 10 mounted at a predetermined height by means not shown, directs a laser beam 11 having a finite height K, tangentially onto the predetermined blade. The emission of light from laser 10 is controlled by stroboscopic control means 16 which may be adjusted by manual phase control 12. Manual control 12 enables the operator to precisely adjust the light emission from the laser 10 such that a particular rotor blade may be illuminated and measured under operating conditions. Photocell 14 is located in the path of laser beam 11 on the opposite side of the tips of turbine blades 7 and is connected to an analyzer-recorder 15. As seen in FIG. 3, the tip of the blade 7 extends at least partially into the path of laser beam 11 to thereby obscure a portion of the beam and prevent it from reaching photocell 14. Photocell 14 may receive from 0 to 100% of beam 11', depending upon the height of the blade. Photocell 14 measures the luminous intensity of the beam 11' and receives and transmits an analog signal to the analyzer-recorder 15. As can be seen, there is a direct correlation between the luminous intensity of beam 11' and the height H of the turbine blade. Prior calibration of the apparatus permits the determination of the exact correspondence between the blade heights and the analog signals received by analyzer-recorder 15. The heights of the blades may be recorded and/or displayed by the analyzer-recorder 15.

The invention thus makes it possible to obtain a precise measurement of the blade heights when they are located in a narrow range of the height K of beam 11, i.e., between heights $H_1$ and $H_2$. The invention also permits precision control of the reduction of the blade heights. Laser 10 is generally located such that laser beam 11 is placed generally parallel to a plane perpendicular to the axis of rotation of turbine rotor 4 such that it tangentially intercepts the blade 7 at the desired height. Should the blade height H exceed this dimension, grinder wheel 8 may be brought into contact with the blade 7 unitl the height reaches a value within the range $H_1$–$H_2$. The operator may then follow and record the measurements in a continuous manner. This may be achieved by manual control 12, connected to electronic coder 13 which is associated with the drive means. Alternatively, the analyzer-recorder 15 may be connected with the grinding wheel drive means as shown at 17 such that the analyzer-recorder automatically controls the position of the grinding wheel 8 as the heights of the blades diminish.

The foregoing is presented for illustrative purposes only and should not be construed as in any way limiting this invention, the scope of which is determined solely by the appended claims.

What is claimed is:

1. A process for determining the height of turbine rotor blades under operating conditions comprising the steps of:
   (a) rotating the turbine rotor at a velocity sufficient to centrifuge all of the blades such that they obtain their maximum radially outward position;
   (b) directing a laser beam having a finite beam height tangentially onto the rotating turbine rotor such that the tips of the blades extend at least partially into the beam;
   (c) stroboscopically controlling the laser beam such that it illuminates only a single rotor blade at a time;
   (d) measuring the luminous intensity of the laser beam passing beyond the rotor blade; and,
   (e) determining the height of the rotor blade based upon the measured luminous intensity.

2. The process according to claim 1 comprising the further step of grinding down the tip of a blade which exceeds a predetermined height.

3. The process according to claim 2 wherein the turbine rotor is rotated at approximately 3000 r.p.m.

4. The process according to claim 1 wherein the turbine rotor is rotated at approximately 3000 r.p.m.

5. Apparatus for determining the height of turbine rotor blades under operating conditions comprising:
   (a) rotating means to rotate the turbine rotor at a velocity sufficient to centrifuge all of the blades such that they obtain their maximum radially outward position;
   (b) laser beam generating means to direct a laser beam having a finite beam height tangentially onto the rotating turbine rotor such that the tips of the blades extend at least partially into the beam;
   (c) control means to stroboscopically control the laser beam generating means such that the laser beam illuminates only a single blade at a time;
   (d) measuring means to measure the luminous intensity of the laser beam passing beyond the rotor blade; and,
   (e) means to determine the height of the blade based upon the measured luminous intensity connected to the measuring means.

6. The apparatus according to claim 5 further comprising means to reduce the height of a blade which exceeds a predetermined value.

7. The apparatus according to claim 6 wherein means to reduce the height of the blade comprises a grinding wheel.

8. The apparatus according to claim 7 wherein the rotating means rotates the turbine rotor at approximately 3000 r.p.m.

9. The apparatus according to claim 6 wherein the rotating means rotates the turbine rotor at approximately 3000 r.p.m.

10. The apparatus according to claim 5 wherein the rotating means rotates the turbine rotor at approximately 3000 r.p.m.

* * * * *